United States Patent [19]
Delaunay et al.

[11] Patent Number: 5,609,891
[45] Date of Patent: Mar. 11, 1997

[54] METHOD TO TREAT MATERIALS BY MICROWAVE

[75] Inventors: Didier Delaunay, Nantes; Henri Jullien, Bourg La Reine; Claude More; Lhoussain Outifa, both of Paris; Michel Delmotte, Bourg La Reine; Bernard Maestrali, Fontainebleau, all of France

[73] Assignee: Regie Nationale des Usines Renault, Boulogne Billancourt, France

[21] Appl. No.: 487,642

[22] Filed: Jun. 7, 1995

[30] Foreign Application Priority Data

Jun. 8, 1994 [FR] France ................... 94 07008

[51] Int. Cl.⁶ .................... B29C 35/08; H05B 6/80
[52] U.S. Cl. .................... 425/174.8 E; 264/489; 425/174.8 R
[58] Field of Search ............ 425/174.4, 174.8 R, 425/174.8 E, 394, 406, 446; 264/489

[56] References Cited

U.S. PATENT DOCUMENTS

| | | | |
|---|---|---|---|
| 4,298,324 | 11/1981 | Soulier | 425/178.8 E |
| 4,617,439 | 10/1986 | Lespinats et al. | 425/178.8 E |
| 4,963,709 | 10/1990 | Kimrey, Jr. | 425/174.8 E |
| 5,032,327 | 7/1991 | Becheret | 425/174.8 R |

FOREIGN PATENT DOCUMENTS

| | | |
|---|---|---|
| 2402526 | 4/1979 | France . |
| 2571201 | 4/1986 | France . |
| 2632890 | 12/1989 | France . |
| 2650775 | 2/1991 | France . |
| 2669557 | 5/1992 | France . |
| 759001 | 10/1956 | United Kingdom . |

*Primary Examiner*—James P. Mackey
*Attorney, Agent, or Firm*—Oblon, Spivak, McClelland, Maier & Neustadt, P.C.

[57] ABSTRACT

A device for microwave treatment of materials includes a mold (1) used to hold the material (3) to be treated and a microwave generator which is used to apply to the mold (1) the microwave energy necessary for treatment of the material. The mold includes at least two dielectric materials (4,5,6,7) surrounding the material (3) to be treated. The dielectric materials have dielectric permittivities which differ so that the attenuation of one elementary segment of length l located between the points of side z(n−1) and zn of the longitudinal dimension of the material (3) to be treated which includes at least one section broken up into segments of length l, is controlled by the relationship:

$$\alpha = \frac{1}{2l} \operatorname{Log} \left\{ 1 - 2\alpha_0 l \frac{Po}{P(n-1)} \right\}$$

in which:

$\alpha$ is the attenuation in the elementary segment in question, $\alpha_0$ is the initial attenuation in the body of the section which includes the elementary segment in question, Po is the microwave power applied to the section, P(n−1) is the microwave power transmitted in the plane of side z(n−1).

8 Claims, 2 Drawing Sheets

METHOD TO TREAT MATERIALS BY MICROWAVE

BACKGROUND OF THE INVENTION

FIELD OF THE INVENTION

This invention pertains to microwave treatment of dielectric materials.

Microwave treatments which are traditionally used for developing or employing dielectric materials, especially organic matrix composite materials, whose dimensions are greater than the half-wavelength of electromagnetic radiation will produce either a system which ensures relative displacement of the material with respect to the spatial structure of the electromagnetic field, or a multi-mode cavity type system with propagation mode mixer.

In the second solution, which employs the application of a pressure constraint, the material to be treated and the dielectric components which make up the group which keeps this material under pressure (die rather than the punch) by their average permittivity, their dimensions and the configuration of their interfaces, constitute a microwave electric circuit which selects the propagation modes. Indeed, experiments show that, with or without a mode mixing unit, homogeneity defects or "heterogeneous markings" will appear in the body of the material to be treated if the treatments are not sufficiently mild and their durations sufficiently prolonged.

The homogeneity defects or markings observed in these experiments result from the establishment of standing wave conditions which are generated in the material due to internal reflections to the interfaces, as a function of the propagation modes excited by these interfaces and as a function of the particular distances which separate them. These effects are that much more considerable as the attenuation of the waves in these types of materials is relatively weak because of the low dielectric constant of losses and as the diffusion of heat does not promote homogenization between the marked zones, because of the thermal conductivity which is also weak and because of the duration of the voluntarily reduced treatments.

This observation of markings caused by the heterogeneities and the incidence of diffusion conditions of heat are clearly specified in the patent FR.84 15 106. In the device described in this patent, the homogenization results exclusively from conditions of thermal conductivity, the applicator remaining the multi-mode type.

For the device described in patent JP-60-135230, the pressure constraint is reduced by placing the materials to be treated or assembled by gluing under vacuum. For this reason the filling of the applicator remains low and does not require specific dielectric conditions for the dielectric constant values.

The patent FR 88 08 081 does not specify any component pertinent to the application of microwave energy or to the conditions of wave propagation.

In order to overcome the disadvantages of the prior art, a "mold" has been proposed in which the electric field of the fundamental wave is guided so as to avoid excitation of hybrid modes which disturb homogeneity of the treatment process.

The great difficulty encountered in the processes for treating materials by microwaves is controlling the spatial distribution of electric energy, particularly the obtaining of homogeneous treatment.

A device for treating dielectric materials by using microwaves which includes a mold intended to contain the material to be treated, means for placing the material contained in the mold under pressure, and a microwave generator used to apply the microwave energy to the mold which is required for treatment of the material has been described in the patent FR 90 14889. The mold includes several dielectric materials which have different dielectric permittivities and which are arranged in the mold so that the dielectric permittivity of the set will vary by decreasing from the material to be treated to the external wall of the mold, the value of the average dielectric permittivity of the dielectric materials being less than the value corresponding to the situation of cut-off of the first order mode greater than the fundamental mode of the electromagnetic wave produced by the generator.

The microwave device described in this patent has the goal of achieving spatially controlled transformation of a material.

This homogeneity is obtained by using a dielectric "mold" in which the fundamental wave of propagation is maintained in order to achieve the largest possible volumes in which the sources of heat are uniformly distributed in space. This patent also defines the conditions for distribution in the space of elements which constitute the dielectric mode in order to obtain a large concentration of the electromagnetic power in the object to be produced. A central feature of this patent is the description of the adaptations of the two interfaces of the dielectric mold, the input interface and output interface for propagation of the mode, so as to maintain a progressive wave without standing wave conditions which will result from possible reflections by poorly adjusted interfaces.

This invention employs three components which are new and different from those described in the aforementioned patent for the design of dielectric devices which constitute the mold with respect to arrangement, shape and dielectric characteristics. These components complement or moderate the recommendation to arrange the dielectrics of decreasing permittivity from the median plane of the applicator toward its external walls.

The invention thus has as an object a device for microwave treatment of materials other than massive metal materials which include a mold whose purpose is to hold the material to be treated, a metal applicator and at least one microwave generator used to apply to the mold the microwave energy which is necessary for treatment of the material, the mold including at least two dielectric materials surrounding the material to be treated, characterized in that the dielectric materials have dielectric permittivities which are different from one another so that the attenuation of an elementary segment of length l located between the points of side z(n−1) and zn of the longitudinal dimension of the material to be treated will include at least one section broken up into segments of length l, is controlled by the relationship:

$$\alpha = \frac{1}{2l} \text{Log} \left\{ 1 - 2\alpha_o l \frac{P_o}{P(n-1)} \right\}$$

in which

α is the attenuation in the elementary segment in question,

αo is the initial attenuation in the body of the section which includes the elementary segment in question, Po is the microwave power applied to the section, P(n−1) is the microwave power transmitted in the plane of side z(n−1).

According to a particular characteristic of the invention, in the case of a section which is broken up into segments of the same length l, the attenuation of the $n^{th}$ segment is controlled by the relationship:

$$\alpha = \frac{1}{2l} \text{Log} \left\{ 1 + 2\alpha_o l \frac{P_o}{e^{-2\alpha_o l} - 2n\alpha_o l} \right\}$$

According to a particular characteristic of the invention, the metal applicator contains the dielectric materials and the material to be treated and its straight section, along its longitudinal dimension, follows the possible curves of the item to be developed from the material to be treated.

According to another characteristic of the invention, at least one of the two dimensions of the transverse section of the applicator is variable in the direction of propagation of microwaves and allows compensation for attenuation of the wave resulting from too great a focusing of waves in the central zone of the applicator.

According to yet another characteristic of the invention the dielectric constants of losses of dielectric materials are different.

BRIEF DESCRIPTION OF THE DRAWINGS

The invention will be better understood by reading the description which follows, which is given with reference to the attached drawings, which are given only by way of example and in which.

DETAILED DESCRIPTION OF THE PREFERRED EMBODIMENTS

Figure 1:
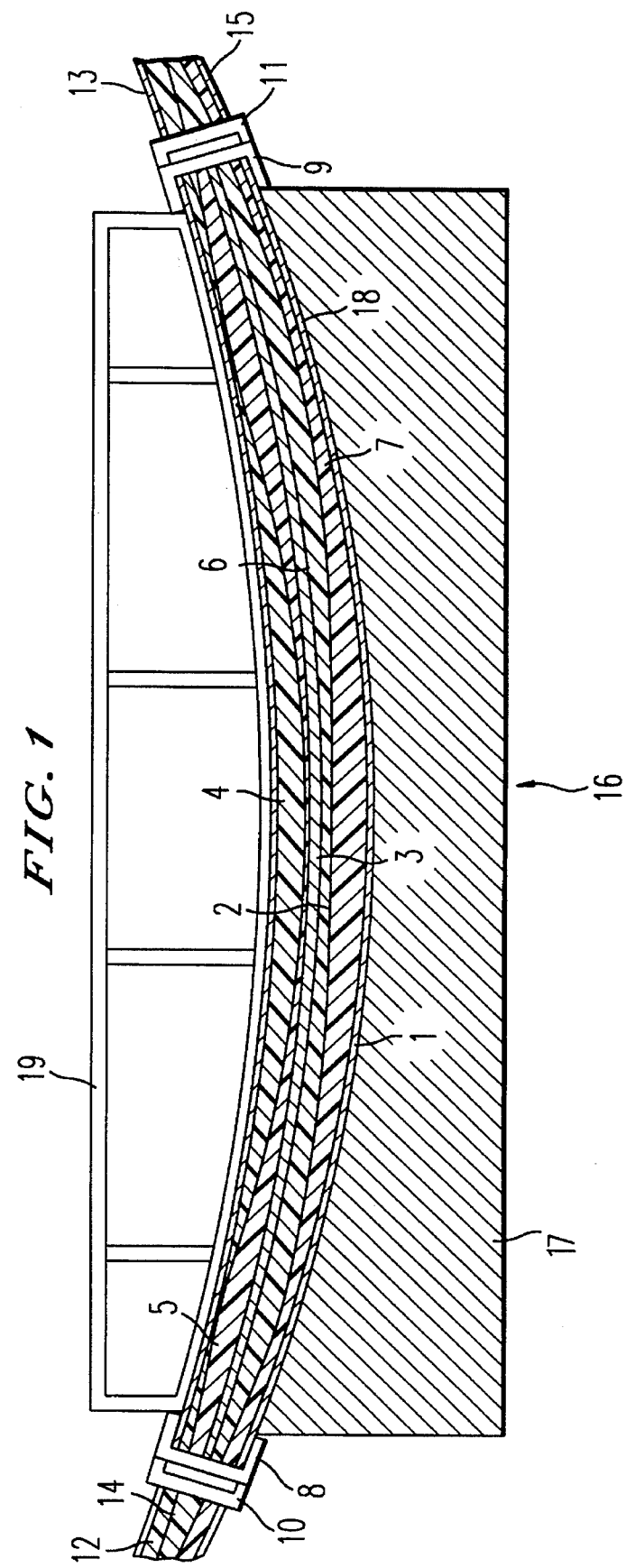
FIG. 1 is a schematic sectional view of a treatment device according to the invention.

The treatment device in accordance with the invention includes a mold 1 which is formed by a waveguide which contains a stack of filling pieces made of dielectric material which outline a cavity 2 with symmetrical shape in which the material to be treated 3 is arranged and which is powered by two microwave generators, not shown, which are arranged at its ends. The stack in the present example consists of four layers of dielectric material 4, 5, 6 and 7.

In the example shown here, the peripheral layers 4 and 7 are made of a dielectric material with specific permittivity, while layers 5 and 6, located in contact with material 3 to be treated, are made of a material with greater permittivity.

The dielectric constants of losses of these materials can also be chosen to be different in order to allow compensation for wave attenuation.

According to the invention, the thicknesses of the dielectric material layers 4 to 7 used for filling of the mold are variable over the length of the material 3 to be treated.

In fact, the two dimensions of the transverse section of the stack formed by layers 4 to 7 of the dielectric materials can vary in the direction of propagation and can also allow compensation for attenuation of the wave resulting from too great a focusing of the waves in the central zone of the applicator, which contains the material 3 to be treated.

These variations of thickness are designed so as to obtain in guide 1 of the treatment device an attenuation of the power applied to the device whose curve along the length of the latter is formed of a set of exponential parts which approach a sloping line $-2\alpha_o$, $\alpha_o$ being the initial attenuation, allowing one to obtain homogeneous absorbed power over the entire length of the part to be treated.

Figure 2:
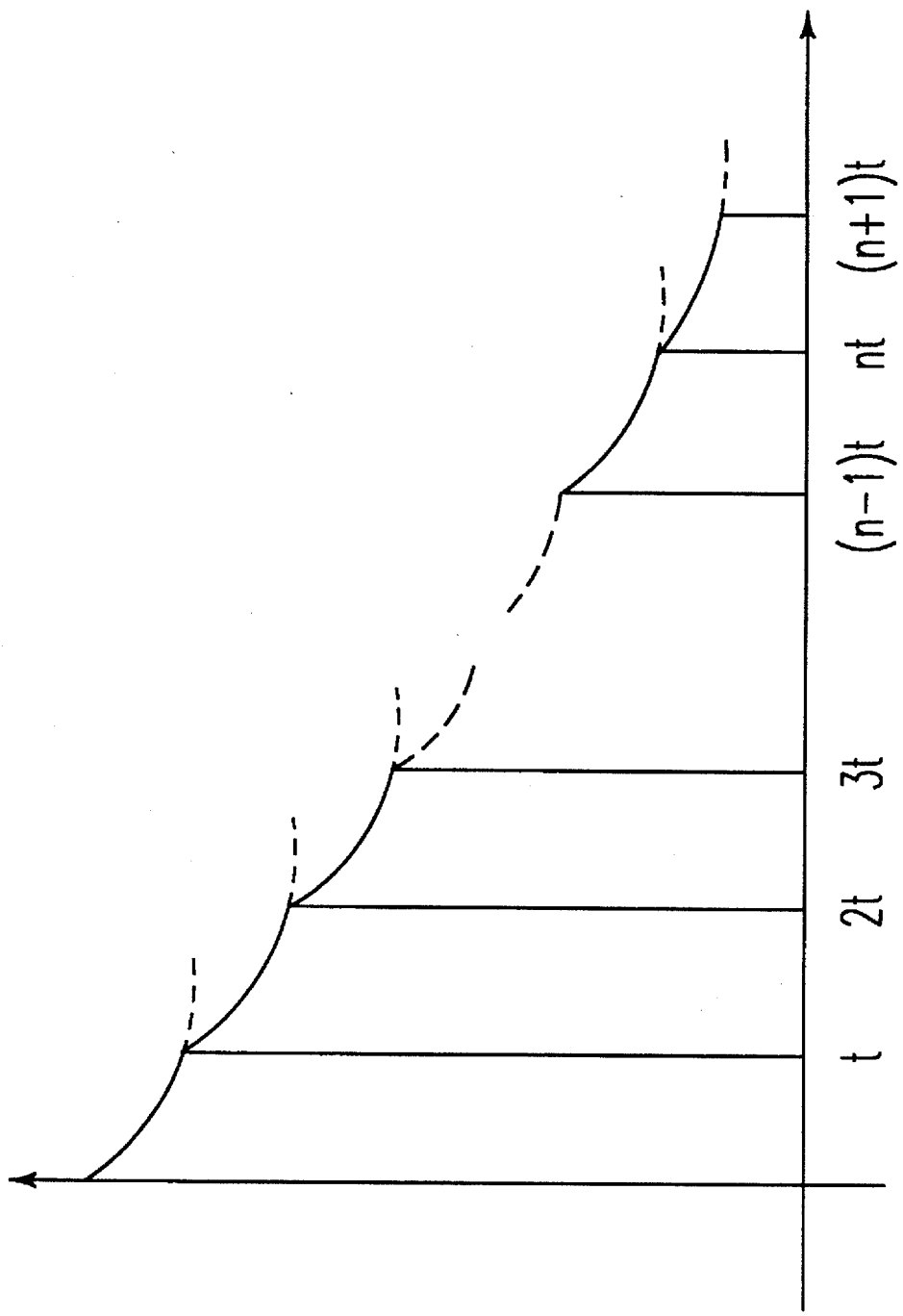
FIG. 2 is a graph which shows the shape of attenuation of the transmitted power, emitted by each generator, which is obtained in a treatment device according to the invention.

The shape of the resulting attenuation is shown in the graph of FIG. 2.

The attenuation of an elementary segment of length l located between the points of side nl and (n+1)l of the longitudinal dimension of a part to be treated is given by the relationship:

$$\alpha = \frac{1}{2l} \text{Log} \left\{ 1 + 2\alpha_o l \frac{P_o}{e^{-2\alpha_o l} - 2n\alpha_o l} \right\}$$

The values of $\alpha_o$ and $\alpha$ are obtained physically by the choice of characteristics and thicknesses of layers 4, 5, 6, 7 of dielectric fill material of mold 1.

The length l of the elementary segments can be selected as a function of the variations of shape of a part to be treated, and a longitudinal dimension of the part made of material to be treated can be broken up into several sections, each one formed of segments l.

In the present mode of implementation, the waveguide 1 has a curved shape, which is adapted to material 3 to be treated which in this case is a part in the form of an arc of variable thickness between its end and its middle section.

However, the waveguide can assume any shape whatsoever corresponding to the shape of the part to be treated.

Thus, along the longitudinal dimension of the waveguide, its straight section follows the possible curves of the part to be treated.

At its two ends the waveguide 1 includes flanges 8, 9, by means of which it is connected to corresponding flanges 10, 11 of the sections of waveguides 12, 13 for connection to the microwave generators which are not shown.

These sections 12 and 13 contain interfaces 14, 15 for input and/or output for the electromagnetic wave which are made of bevel edges which promote propagation by example of the fundamental mode in the mold.

According to one particular mode of implementation, the waveguide 1 of the mold of the device according to the invention is placed in a pressure application device 16, which includes a die 17 in which one provides a chamber 18 which is open in its upper part having a shape adapted to that of the waveguide 1 and with which a plunger 19 works for application of pressure in waveguide 1.

However, the treatment device according to the invention can also be provided with means for application of pressure.

The concentration of electromagnetic power through the arrangement of dielectric materials of the mold with decreasing variation of the permittivity from that of the material to be treated toward the fill materials with permittivity of about 1 can lead to attenuation of the wave which is not compatible with the length of the treated objects. It would seem best to be located between great efficiency or energy output on the one hand, and sufficiently low attenuation to longitudinally treat parts of great length on the other hand. The dielectrics which make up the molds therefore offer, in addition to transverse structural arrangement in the applicator, longitudinal structural arrangement in the direction of the propagation. This longitudinal structural arrangement is such that, in the vicinity of the input interface, the transverse structural arrangement is barely marked. On the contrary, in the case of one-directional propagation of microwaves coming from a single source, in the vicinity of the output interface, the transverse structural arrangement corresponds to the recommended situation: transverse decrease of the permittivity of material 3 to be treated toward the external planes. Between these two extreme arrangements, the longitudinal structural arrangement offers continuous variation of the transverse structural arrangement. Under these conditions one will observe compensation for attenuation by means of increasing concentration of electromagnetic power in the body of the part to be treated in the direction of propagation.

This new mode of applicator loading, which is richer in dielectrics of different thicknesses and different types, can result in a value of average dielectric permittivity greater than the corresponding value for the situation of cut-off of the primary mode of higher order propagation. As a consequence, higher order propagation modes, if they are excited, can be manifested and give rise to actual propagation.

In order to avoid this excitation, it is necessary that the air-dielectric or dielectric-dielectric interfaces not generate harmful components of the electric field vector.

In order that this occur, the interfaces 14 and 15, in a convenient number, are beveled and arranged so as to allow only the fundamental mode to develop. The limitation to a value of average dielectric permittivity less than the value of the situation of cut-off of the first mode of higher order is then exceeded.

The two concepts for compensation of attenuation and maintenance of the single fundamental mode beyond the cut-off frequency of higher order modes will lead to the following generalization. In French patent No. 90-14889, the main property of the central zone of the dielectric mold is the identity of the permittivities of the material to be treated and its immediate dielectric environment. The details of shape of the part to be developed are revealed in the mold, and the electromagnetic propagation is not modified. On the contrary, for considerable mass of variations or for materials with elevated absorption constant, the wave attenuation is marked. Under these conditions the dielectric mold must compensate for the massive or absorbing zones of the object to be produced by bulk dielectrics and sufficiently elevated permittivity in order to appropriately reduce the attenuation. A modification adjusted for the transverse dimension of the applicator can lead to the same result. That is what allows one to obtain the layout of FIG. 1 in which the thicknesses of dielectric material layers 4 to 7 which fill mold 1 vary along the length of the latter according to a law determined by the variation of attenuation to be obtained.

The industrial and economic benefits of uses of this invention reside in obtaining a desired spatial distribution of heat sources at the time of implementation and thermal transformation of the materials. This homogeneity allows one to work under quasi-adiabatic conditions. Thus, the real economic advantages are:

a gain of time, especially for the worst conducting materials and for molds that have large thermal inertia, a gain of energy, which results from reduction of the duration of treatments and distribution of pre-heating of the tools.

The areas of application are especially plastics processing and production of composite materials include thermosetting matrix composites (epoxies, polyesters . . . ), which are molded or extruded, or thermoplastic matrix composites (PE, PP . . . ), parts made of rubber, especially ones made of expanded foam rubber, parts made of thermoplastic foam material, parts for optical devices made of polycarbonate or polymethacrylate and thermal insulation devices. Also areas concerned with thermal treatment of objects of definite shape (agriculture and food, pharmacy) or involving indispensable control of spatial distribution of temperature (chemical engineering).

We will now present, by means of an nonlimiting example, dielectric materials which are used for mold filling.

|  | permittivity | count of dielectric losses |
| --- | --- | --- |
| silicon-glass composite | $\epsilon' = 4.5$ | $\epsilon'' = 0.03$ |
| mica base composite | $\epsilon' = 5.5$ | $\epsilon'' = 0.01$ |
| sintered aluminum | $\epsilon' = 9.0$ | $\epsilon'' = 0.002$ |
| glass-epoxy composite | $\epsilon' = 4.5$ | $\epsilon'' = 0.05$ |

These materials are assembled in the mold as a function of the attenuations which one desires to obtain.

In the example which has just been described, the device of the invention is applied to treatment of a composite material with organic die.

In any case one can envisage the application of this device to treatment of different materials such as polymer materials, mineral matrix composites, food products, chemical reagents and others, with the exception of a mass of metal materials in which none of the three dimensions is less than one-thousandth of the wavelength of the sources which are used.

We claim:

1. Device for microwave treatment of materials other than a mass of metal materials, comprising a mold for holding the material to be treated and at least one microwave generator for applying the microwave energy necessary for treatment of the material in the mold the mold including at least two dielectric materials which surround the material to be treated, wherein the dielectric materials have dielectric permittivities which differ from one another so that the attenuation of one elementary segment of length l located between the points of side z(n−1) and zn of the longitudinal dimension of the material to be treated, which includes at least one section broken up into segments of length l, is controlled by the relationship $$\alpha = \frac{1}{2l} \text{Log} \left\{ 1 - 2\alpha o l \frac{Po}{P(n-1)} \right\}$$

in which:

α is the attenuation in the elementary segment in question,

αo is the initial attenuation in the body of the section which includes the elementary segment in question, Po is the microwave power applied to the section, P(n−1) is the microwave power transmitted in the plane of side z(n−1).

2. Device according to claim 1, wherein for a section which is broken up into segments of the same length l, the attenuation of the $n^{th}$ segment is controlled by the relationship:

$$\alpha = \frac{1}{2l} \text{Log } 1 + 2\alpha o l \left\{ \frac{Po}{e^{-2\alpha o l} - 2n\alpha o l} \right\}$$

3. Device according to either of claims 1 and 2, wherein said dielectric materials form a stack which fills a waveguide of the mold and includes peripheral layers of dielectric material which have a certain permittivity, and of other layers of the dielectric material which have increased permittivity, that are located in contact with the material to be treated.

4. Device according to claim 3, wherein the layers of the dielectric material which fill the mold focus the waves in the central zone of the mold while their variable section compensates for wave attenuation.

5. Device according to one of claims 1 or 2, wherein the two dimensions of the transverse section of the stack formed by the layers of dielectric material of the fill material of the mold are variable along the length of the material to be treated.

6. Device according to one of claims 1 or 2, wherein the mold has a shape which is adjusted to that of the material to be treated at least along the longitudinal dimension of the latter.

7. Device according to one of claims 1 or 2, wherein the dielectric constants of losses of the dielectric materials are adjusted to the desired attenuation conditions.

8. Device according to one of claims 1 or 2, further comprising means for placing the material to be treated which is contained in the mold under pressure, and wherein the dielectric materials are materials which are resistant to the application of the mechanical constraint.

* * * * *